Patented Nov. 14, 1939

2,180,299

UNITED STATES PATENT OFFICE 2,180,299

PROCESS FOR THE PREPARATION OF ANTHRAQUINONE COMPOUNDS

Melvin A. Perkins, Milwaukee, Wis., assignor to E. I. du Pont de Nemours & Company, Wilmington, Del., a corporation of Delaware No Drawing. Application April 22, 1938, Serial No. 203,610

5 Claims. (Cl. 260—357)

This invention relates to the preparation of anthraquinone compounds and more particularly to an improved process for the preparation of dibenzanthrone and isodibenzanthrone in substantially pure form.

It is generally known that anthraquinone compounds may be dissolved in 100% sulfuric acid and that they may be precipitated from such acid by drowning in water. It is also known that many compounds of this class may be selectively precipitated from concentrated sulfuric acid upon gradual dilution of the acid. In many cases, however, and particularly in the case of dibenzanthrone and isodibenzanthrone, impurities are precipitated together with the desired dyestuff on drowning a sulfuric acid solution of the same. Attempts have been made to obtain dibenzanthrone and isodibenzanthrone in a more pure form by fractional crystallization from sulfuric acid solutions in which the concentration of acid is gradually reduced to a point where the desired dibenzanthrone compound is precipitated while at least part of the impurities remain in the solution and are filtered off. It has been found, however, that on the gradual dilution of a sulfuric acid solution of dibenzanthrone or isodibenzanthrone the compound is precipitated in such a finely divided form that it is difficult and often impossible to filter, particularly on a commercial scale, and varying the temperature of the solution from which the dibenzanthrone compound has been or is being precipitated does not overcome this difficulty.

It is an object of this invention to provide a simple and economical process for purifying dibenzanthrone and isodibenzanthrone which is particularly adaptable for large scale manufacture of these products and by which the compounds may be obtained in a very pure form and in high yield.

I have found that when dibenzanthrone or isodibenzanthrone is dissolved or partially dissolved in sulfuric acid and the acid concentration of the mass adjusted to from 94.5 to 97.5%, after prolonged agitation at temperatures below 50° C. the dibenzanthrone or isodibenzanthrone is at least in part converted into large readily filterable crystals, and that on further dilution of the mass to precipitate the remaining dibenzanthrone or iso-dibenzanthrone at acid concentrations of not less than 90% a readily filterable mass is obtained from which the mother liquor which contains the impurities may be easily washed to give a very pure dibenzanthrone or isodibenzanthrone. To obtain the dibenzanthrone in an extraordinarily high degree of purity and in high yields and to give a cake which filters readily it should be crystallized from acid of 94.5 to 97.5% concentration at temperatures below 50° C. The amount of concentrated sulfuric acid in which the dibenzanthrone is suspended or dissolved may vary widely. Enough should be used to give an easily stirrable suspension of the crude dibenzanthrone compound. The amount may vary from 5 to 20 parts of concentrated sulfuric acid per part of crude dibenzanthrone. Approximately 10 parts of acid per part of dibenzanthrone has been found to give very satisfactory results since it gives a readily filterable mass from which the impurities can be readily washed. While larger amounts may be employed, it merely adds to the cost of the process without giving any material advantage.

Where the original crude material is dissolved in acid of somewhat less concentration than that specified above, smaller crystals are obtained which are difficult to filter. These crystals, however, may be converted into the larger rod-like variety by raising the concentration of acid within the limit specified and agitating for a prolonged period of time at temperatures below 50° C. When the crude materials are dissolved in acid, such as 100% acid, the large rod-like crystals are formed on prolonged agitation in contact with air, for the acid is gradually diluted due to absorption of atmospheric moisture.

After the desired crystalline form has been obtained the mass may be diluted with more dilute sulfuric acid, such as 78% sulfuric, to any concentration not below 90% to completely precipitate the dibenzanthrone or isodibenzanthrone without precipitating any substantial amount of impurities. The mass is preferably filtered while the acid concentration is maintained at from 90 to 96%, since at a concentration below 90% many impurities are precipitated in amorphous form, which greatly retards filtration, and which contaminate the desired product. To obtain all of the dibenzanthrone from the solution the acid concentration should be reduced to from 90 to 92.5%.

At temperatures materially above 50° C. the solubility of dibenzanthrone in the particular concentration of acid employed is materially altered, so that at the higher temperatures the desired crystal structure is not obtained.

While the isodibenzanthrone may be precipitated in a very pure form under identical conditions with those employed for dibenzanthrone, it has been found that for maximum efficiency the concentration of acid should be maintained somewhat higher, such as between 98.5 to 100%, during the crystallization. The acid concentration should then be reduced to from 90 to 94% to give maximum yields of the isodibenzanthrone.

The following examples are given to illustrate the invention more fully. The parts used are by weight.

*Example 1*

To 2000 parts of 96.6% sulfuric acid add 200 parts of crude dibenzanthrone at room temperature. Stir in an enclosed vessel until large crystals of an orange-brown or bluish color appear, and continue agitation until no further increase in crystal formation occurs. This period will depend upon the purity of the dibenzanthrone used and may vary from about one hour to two or three days. When crystallization reaches an equilibrium, drip in enough 78% sulfuric acid to reduce the acidity to 92.0% (exclusive of organic material). Cool to 25° C. and filter. The filtration is rapid and the purified dibenzanthrone is obtained almost entirely free of by-products, especially after washing with from 400 to 1200 parts of 86–93% sulfuric acid. The purity of the material may be checked by dyeings of both fractions as well as by the color of their very dilute solutions in sulfuric acid. Furthermore, only traces of the dibenzanthrone are lost in the filtrate and wash liquor.

Isodibenzanthrone may be purified by this same procedure, although for maximum filtration speed sulfuric acid of somewhat higher concentration should be used.

*Example 2*

Slurry 100 parts of isodibenzanthrone (obtained, for example, by the alcoholic caustic fusion of Bz-1, Bz-1'-dibenzanthronyl selenide; see U. S. Patent 1,924,456) in 1000 parts of 97.2% sulfuric acid. Yellowish green needles are formed. To this suspension add 85 parts of 60% oleum dropwise and stir until the very long pointed needles are entirely replaced by rod-like crystals of large cross-section. Then dilute the mass to approximately 93% $H_2SO_4$ (organic-free basis) by adding 78% acid very slowly. Cool to 25° C. and filter. Wash with 200 parts of 93% sulfuric acid. Both filtration and wash are very rapid and the separation of isodibenzanthrone from impurities is essentially quantitative.

*Example 3*

Slurry 50 parts of crude dibenzanthrone in 1000 parts of 95.8% sulfuric acid at room temperature. When using dibenzanthrone of 70 to 80% purity, complete solution does not occur. Stir until crystal formation appears complete and microscopic examination shows only clean-cut crystals in a clear background. Then filter on an acid resisting filtering medium and apply suction until no more filtrate comes through Hydrolyze the filter cake which would appear to be in the oxonium sulfate form. Precipitate the remaining dyestuff from the acid filtrate by drowning in water. Filter both fractions separately, wash acid-free, and dry. The purified fraction from filter cake will be found to give much stronger and brighter dyeings than the "filtrate" fraction. When soaped, the dyeings of the purified fraction are much redder than those obtained from the original material, while the unsoaped dyeings are greener.

I claim:

1. In the preparation of a substantially pure compound of the class consisting of dibenzanthrone and isodibenzanthrone, the step which comprises agitating the crude compound at a temperature not exceeding 50° C. in sulfuric acid of a concentration in which the compound is substantially completely but not entirely dissolved until it is converted into large, readily filterable crystals.

2. In the process for preparing a substantially pure compound of the class consisting of dibenzanthrone and isodibenzanthrone, the step which comprises agitating the crude compound at a temperature not above 50° C. in sulfuric acid of a concentration of 94.5 to 97.5%, until the product is converted into large crystals.

3. In the process for preparing a substantially pure compound of the class consisting of dibenzanthrone and isodibenzanthrone, the step which comprises agitating the crude compound at a temperature not above 50° C. in sulfuric acid of a concentration of 94.5 to 97.5%, until the product is converted into large crystals, further diluting the sulfuric acid to not less than 90% acid concentration to precipitate substantially all of the dibenzanthrone or isodibenzanthrone, and filtering the resulting suspension.

4. In the process for preparing substantially pure dibenzanthrone, the step which comprises agitating the crude dibenzanthrone at a temperature not above 50° C. in sulfuric acid of a concentration of 94.5 to 97.5% until it is converted into large crystals.

5. In the process for preparing substantially pure dibenzanthrone, the step which comprises agitating the crude dibenzanthrone at a temperature not above 50° C. in sulfuric acid of a concentration of 94.5 to 97.5%, until it is converted into large crystals, further diluting the sulfuric acid to not less than 90% acid concentration to precipitate substantially all of the dibenzanthrone, and filtering the resulting suspension.

MELVIN A. PERKINS.